May 31, 1938.  L. G. RONDELLE  2,119,027
AUTOMOBILE MOTOR ATTACHMENT
Original Filed Sept. 25, 1931
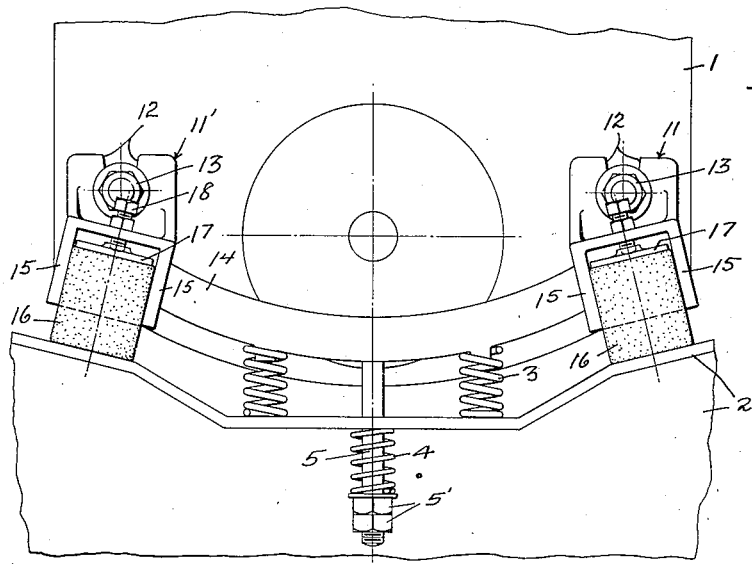
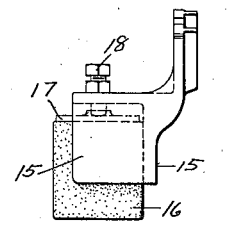
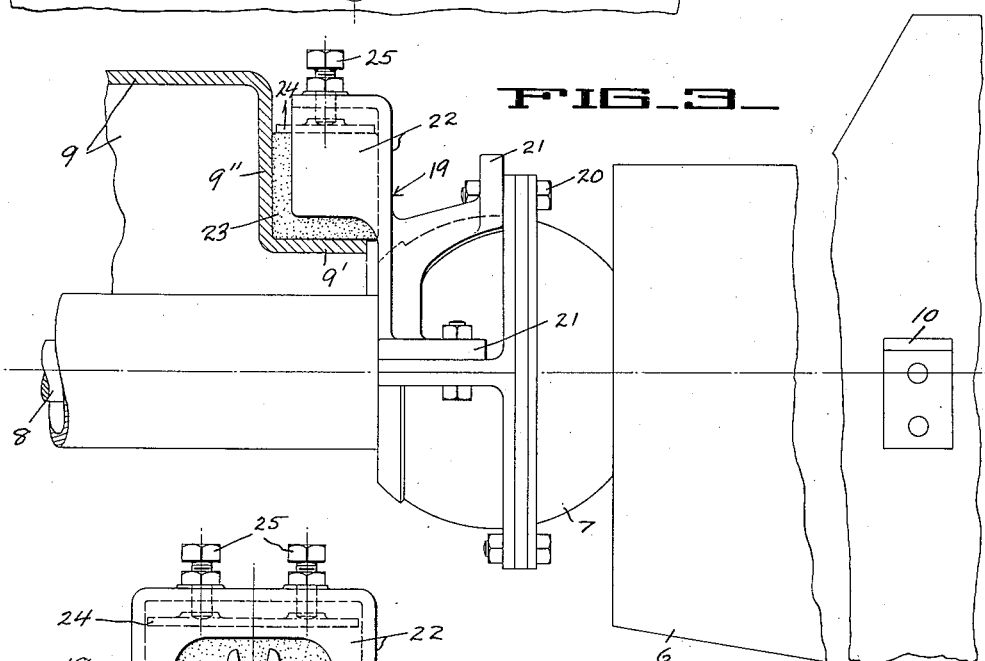
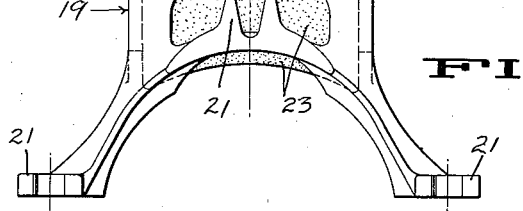
INVENTOR.
Louis G. Rondelle
BY Boyken & Mohler
ATTORNEYS Patented May 31, 1938

2,119,027

UNITED STATES PATENT OFFICE 2,119,027

AUTOMOBILE MOTOR ATTACHMENT

Louis G. Rondelle, San Francisco, Calif.

Original application September 25, 1931, Serial No. 565,013, now Patent No. 2,079,183, dated May 4, 1937. Divided and this application April 14, 1937, Serial No. 136,859

5 Claims. (Cl. 248—7)

This invention relates to means for overcoming objectionable engine vibration on automobiles and is a division of co-pending application Ser. No. 565,013, filed September 25, 1931 which has now matured into Patent No. 2,079,183 of May 4, 1937. The object of the invention is to provide means adapted to cooperate with the existing structure on automobiles for the above mentioned purpose. Another object of the invention is to provide simple inexpensive means which may be quickly and easily applied to automobiles and which may be easily adjusted to produce the maximum beneficial results.

Other objects and advantages of the invention will appear in the following description and accompanying drawing.

In the drawing Fig. 1 is a front elevation of a portion of the engine of an automobile and supporting frame brace showing the invention applied thereto.

Fig. 2 is a side elevation of the rear end of the engine assemblage or transmission and universal housings showing the invention applied.

Fig. 3 is an enlarged side view of one of the special brackets of Fig. 1.

Fig. 4 is an enlarged front view of the special bracket of Fig. 2.

Before describing the invention it would be well to state that in certain automobiles the engine, clutch housing, transmission housing and universal housing, are all secured together as a rigid unit and that this unit is supported at its forward end in a cradle on two springs from a frame cross member, and at the rear portion of the engine by brackets bolted to the chassis frame with rubber interposed.

In a construction described, and which is familiar to the majority of the motoring public there is set up a very objectionable vibration from the engine which results in a body roar at critical engine speeds so that comfort and conversation are made impossible, and it is to overcome this vibration that the special apparatus to be described has been invented.

In Fig. 1 of the drawing 1 is the engine casing, 2 the front channel-shaped cross member supporting the forward part of the engine on springs 3, stabilized by another spring 4 around a downwardly extending tension bolt 5 provided with nuts 5' for adjusting the tension on the springs. A cradle member 14 lies between the springs and engine casing.

In Fig. 2 of the drawing 6 is the transmission housing, 7 the universal joint housing, 8 the propeller shaft, 9 the cross frame member of Z shape which passes over and clear of the driving mechanism and joins the two side members of the chassis frame (not shown).

Also to be considered is the rearward engine supporting brackets which extend to the frame and the position of which on both sides of the engine is about as indicated at 10.

All the above numbered parts are old and well known in the art.

The present invention supplements the support of the engine and takes up all vibration and consists of (Figs. 1 and 2) a pair of special bracket castings 11, 11' made right and left and formed with open-ended slots 12 to slide under existing bolt nuts 13 located at opposite front corners of the engine which secure it to the cradle 14, and which brackets are each formed with a downwardly directed open pocket having three walls 15 embracing a large rectangular block of tough resilient rubber 16 which rests firmly against the top of the frame cross member 2, with two opposed sides against the sides of the channel, the single bolt slot 12 permitting adjustment to bring the lower end of the rubber block square against the angularly disposed portion presented by the cross member at this point.

Within each bracket pocket is a loose plate 17 of metal impinged on top by a tight fitting set screw 18 threaded through the top of the bracket and by means of which the rubber block may be forced downward to bring a considerable compression on the rubber and equalize both sides.

At the rearward end of the engine assemblage is a special bracket 19 firmly bolted to the universal joint housing 7 by three bolts 20 through slotted lugs 21, and existing flange bolt holes in the universal housing. This bracket is also provided with a downwardly directed open pocket, but it is defined by three walls 22 making it open in back as well as at the bottom. The pocket of the bracket is arranged just above the lower horizontally extending leg 9' of Z bar transverse frame member and within the pocket is a large block of tough resilient rubber 23 formed to fit both against the lower leg 9' as well as the vertical wall 9" of the Z bar frame member. Within the pocket of the bracket above the rubber block is a loose plate 24 of metal against which impinge two set screws 25, threaded through the top of the pocket wall, and by means of which a pressure may be put upon the rubber to carry a substantial portion of the engine assemblage load.

By the provision of the three special brackets in the positions and operating as described, an adjustable resilient upward strain may be applied to the engine assemblage at the three spaced points described, and which cooperating with the existing resilient supports effectually absorbs so much of the engine vibration as to make even four cylinder engines run with substantially the smoothness of a six cylinder machine.

I am aware of course that rubber suspension of an engine is not broadly new, but I believe my simple means of applying it is new, and therefore I claim:

1. A motor vibration-check for an automobile having a transversely extending frame member in the vicinity of the ball joint housing, comprising a bifurcated bracket demountably connected to the housing without modification thereof, and said bracket being connected to the flanges of the housing, and resilient means to connect the bracket to the said frame member and to serve as cushioning means to prevent transmission of vibrations from the housing to the frame.

2. In a vibration clamping means, the combination with a vehicle frame and a sectional universal joint housing of the transmission means of the vehicle, the housing sections being secured together by bolts, of a bracket extending partially around the housing and secured thereto by said bolts, one end of the bracket extending toward and adjacent said frame, and spring means between the bracket and the frame for spacing and supporting the same relative to each other.

3. In combination, an automobile frame having a cross member, a forward universal joint housing adjacent the cross member, and a hanger secured to said housing and having a rigid part extending upward and overhanging the cross member, and a resilient member interposed between the cross member and the rigid part.

4. In combination, an automobile frame having a cross member, a universal joint housing adjacent the cross member, a hanger secured to said housing and having an arm overlying a portion of the cross member, and a resilient body interposed between the arm and cross member to rest upon the latter under compression.

5. In combination with an automobile engine unit, including the engine, and a universal joint housing at the rear end of the engine connected to the engine as a unit therewith, an automobile chassis frame comprising side frame members extending along opposite sides of the engine unit and including a cross frame member extending between the side frame members adjacent the rear of the engine, single resilient means engaging between the cross frame member and engine unit adapted to yieldably support the rear end of the engine, including said universal joint housing, a bracket secured to said universal joint housing, said bracket and cross frame member being formed to coact for retaining the resilient means in assembled relation with the cross frame member and bracket against displacement.

LOUIS G. RONDELLE.